US009309867B2

(12) United States Patent
Brickett

(10) Patent No.: US 9,309,867 B2
(45) Date of Patent: Apr. 12, 2016

(54) METHOD AND APPARATUS FOR FLUID TURBINE HAVING A LINEAR ACTUATOR

(76) Inventor: Benjamin P. Brickett, Eliot, ME (US)

( * ) Notice: Subject to any disclaimer, the term of this patent is extended or adjusted under 35 U.S.C. 154(b) by 1553 days.

(21) Appl. No.: 12/689,500

(22) Filed: Jan. 19, 2010

(65) Prior Publication Data

US 2010/0181770 A1 Jul. 22, 2010

Related U.S. Application Data

(60) Provisional application No. 61/145,376, filed on Jan. 16, 2009.

(51) Int. Cl.
| | | |
|---|---|---|
| H02P 9/04 | (2006.01) | |
| H02K 19/16 | (2006.01) | |
| F03D 7/02 | (2006.01) | |
| F03D 9/00 | (2006.01) | |
| H02K 21/02 | (2006.01) | |
| H02K 7/18 | (2006.01) | |

(52) U.S. Cl.
CPC .............. *F03D 7/0272* (2013.01); *F03D 9/002* (2013.01); *H02K 7/1869* (2013.01); *H02K 21/026* (2013.01); *F05B 2270/1033* (2013.01); *Y02E 10/38* (2013.01); *Y02E 10/723* (2013.01); *Y02E 10/725* (2013.01)

(58) Field of Classification Search
CPC ..... F03D 9/002; F03D 7/0272; H02K 21/026; H02K 7/1869; H02K 21/024
USPC ............ 290/44, 55; 416/1, 132 B, 7; 415/2.1, 415/4.1, 4.2, 4.5, 4.4, 4.3; 310/209
See application file for complete search history.

(56) References Cited

U.S. PATENT DOCUMENTS

| | | | |
|---|---|---|---|
| 2,484,197 A * | 10/1949 | Veldhuis | .......................... 290/44 |
| 3,525,005 A * | 8/1970 | Beyers | ..................... 310/156.32 |
| 4,110,631 A | 8/1978 | Salter | |
| 4,168,439 A | 9/1979 | Palma | |
| 5,436,508 A * | 7/1995 | Sorensen | ......................... 290/55 |
| 5,997,252 A | 12/1999 | Miller | |
| 6,064,123 A | 5/2000 | Gislason | |
| 6,951,443 B1 * | 10/2005 | Blakemore | .................... 415/4.3 |
| 7,215,038 B2 | 5/2007 | Bacon | |
| 7,303,369 B2 | 12/2007 | Rowan et al. | |
| 7,382,074 B2 | 6/2008 | Ashodia | |
| 7,417,334 B2 | 8/2008 | Uchiyama | |
| 2001/0004439 A1 | 6/2001 | Bolcich et al. | |
| 2003/0223868 A1 * | 12/2003 | Dawson et al. | .................... 416/1 |
| 2004/0041409 A1 | 3/2004 | Gabrys | |
| 2004/0160062 A1 | 8/2004 | Tomas | |
| 2005/0196281 A1 * | 9/2005 | Kim et al. | ................. 416/132 B |
| 2006/0138777 A1 | 6/2006 | Hofbauer et al. | |

(Continued)

FOREIGN PATENT DOCUMENTS

| | | | |
|---|---|---|---|
| DE | 3402035 A1 * | 7/1985 | |
| WO | 91-05953 A1 | 5/1991 | |

*Primary Examiner* — Abdullah Riyami
*Assistant Examiner* — Viet Nguyen
(74) *Attorney, Agent, or Firm* — Hayes Soloway, P.C.

(57) ABSTRACT

A fluid turbine apparatus contains a set of radially arranged magnets and a set of radially arranged coils axially aligned with the set of radially arranged magnets. A turbine base supports a first of the sets. A plurality of vanes having a rotatable connection to the turbine base is coupled to a second of the sets. A linear actuator supported on the turbine base influences the axial proximity of the set of radially arranged magnets to the set of radially arranged coils.

20 Claims, 7 Drawing Sheets

(56) References Cited

U.S. PATENT DOCUMENTS

| | | |
|---|---|---|
| 2007/0040385 A1 | 2/2007 | Uchiyama |
| 2008/0203831 A1 | 8/2008 | French |
| 2008/0213083 A1 | 9/2008 | Unno |
| 2008/0273978 A1 | 11/2008 | Watkins |
| 2008/0293260 A1* | 11/2008 | Christoffersen ............ 439/33 |
| 2010/0215502 A1* | 8/2010 | Harrison ................ 416/205 |

* cited by examiner

METHOD AND APPARATUS FOR FLUID TURBINE HAVING A LINEAR ACTUATOR

CROSS REFERENCE TO RELATED APPLICATION

This application claims benefit of U.S. Provisional Application Ser. No. 61/145,376 filed Jan. 16, 2009, the entire disclosure of which is incorporated herein by reference.

FIELD

The present disclosure is generally related to fluid turbines, and more particularly is related to a fluid turbine having a linear actuator.

BACKGROUND

Though developed centuries ago, wind-powered devices are still a favored source of power generation today. The windmill, once used to grind grain, has been adapted to produce electricity. Windmills have evolved into wind turbines wherein the wind's power no longer turns stone wheels atop grain, but rather passes magnets alongside wire coils to generate electricity. In wind turbines, the wind's force pushes the vanes of a wheel which act as the rotors of a generator. Turbines have also been adapted to produce electricity by using the flow other fluids such as water, steam, and gas.

Over time, fluid turbines have been developed to work more efficiently in compensating for many of the natural obstacles impeding consistent energy recovery from the fluids. For example, shifts in wind or water direction can stop a fixed fluid turbine; thus, fluid turbines have been constructed with various rotational methods so that the wind or water will strike the blade in the optimum fashion. Further, wind and water turbines have been developed whereby fluctuations in wind or water velocity leave the fluid turbine relatively unaffected in structural integrity.

Fluid turbines are not without their problems, however. One problem that remains is constant power generation from inconsistent forces of the fluid. The magnets and wire coils present some resistance to rotation of the vanes of the fluid turbine. The nearer the magnets and wire coils pass the greater the resistance, which leaves the fluid turbine in a state of inertia in light fluid forces. The counter issue is that the further the magnets and wire coils pass, the less power is generated, particularly in strong fluid forces. As a result, sacrifices are made that limit efficiencies, generally leaving wind turbines operable in 10-30 mph winds and water turbines requiring current velocities of at least approximately 2 m/s.

Thus, a heretofore unaddressed need exists in the industry to address the aforementioned deficiencies and inadequacies.

SUMMARY

Embodiments of the present disclosure provide a system and method for a wind turbine having a linear actuator to influence the axial proximity between a set of radially arranged magnets and a set of radially arranged coils. Briefly described, in architecture, one embodiment of the system, among others, can be implemented as follows. The system contains a set of radially arranged magnets. A set of radially arranged coils is axially aligned with the set of radially arranged magnets. A turbine base supports a first of the sets. A plurality of vanes has a rotatable connection to the turbine base and is coupled to a second of the sets. A linear actuator supported on the turbine base, influences the axial proximity of the set of radially arranged magnets to the set of radially arranged coils.

The present disclosure can also be viewed as providing a method of operating a fluid turbine apparatus. In this regard, one embodiment of such a method, among others, can be broadly summarized by the following steps: providing a set of radially arranged magnets, a set of radially arranged coils, and a turbine base supporting at least one of the sets, wherein the set of radially arranged coils axially aligned with the set of radially arranged magnets; rotating a plurality of vanes having a rotatable connection to the turbine base and coupled to at least one of the sets; and influencing the axial proximity of the set of radially arranged magnets to the set of radially arranged coils with a linear actuator engaged with the turbine base and at least one of the sets.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale. Instead emphasis is being placed upon illustrating clearly the principles of the present disclosure. Moreover, in the drawings, like reference numerals designate corresponding parts throughout the several views.

DETAILED DESCRIPTION

Figure 1:
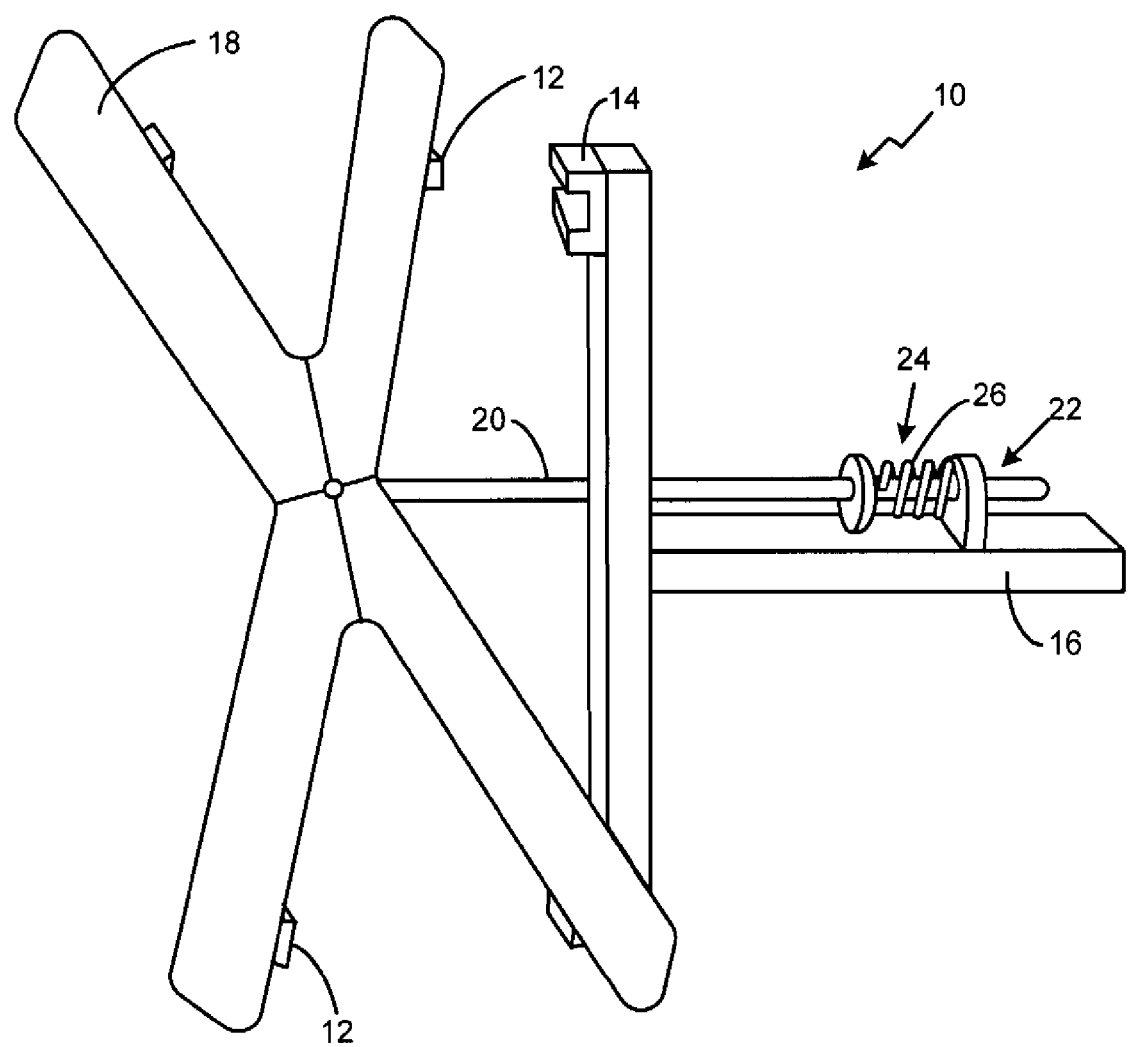
FIG. 1 is an illustration of a perspective view of a fluid turbine apparatus, in accordance with a first exemplary embodiment of the present disclosure.

Embodiments of the present disclosure provide a fluid turbine apparatus and a method of operating such apparatus. FIG. 1 is an illustration of a perspective view of a fluid turbine apparatus 10, in accordance with a first exemplary embodiment of the present disclosure. The fluid turbine apparatus 10 includes a set of radially arranged magnets 12 and a set of radially arranged coils 14, axially aligned with the set of radially arranged magnets 12. A turbine base 16 supports at least one of the sets. A plurality of vanes 18 has a rotatable connection 20 to the turbine base 16 and is coupled to a second of the sets. The plurality of vanes 18 may also have a linearly slideable connection 22 to the turbine base 16. A linear actuator 24 is supported on the turbine base 16. The linear actuator 24 influences the axial proximity of the set of radially arranged magnets 12 to the set of radially arranged coils 14. The linear actuator 24 may be an elastic member 26.

The fluid turbine apparatus 10 captures fluid forces generated by wind, water, or other force driven mediums and converts them into electrical power. The force generated by the fluid rotates the plurality of vanes 18 having a rotatable connection 20 to the turbine base 16. The rotation of the plurality of vanes 18, in response to fluid force, will cause the set of radially arranged magnets 12 and set of radially arranged coils 14 to pass near each other and generate electrical power.

The axial alignment of the set of radially arranged magnets 12 with the set of radially arranged coils 14 allows for the apparatus 10 to generate power when the radially arranged magnets 12 and radially arranged coils 14 pass near each other. The flux field of the radially arranged magnets 12, the inductive properties of the coils 14, and the proximity of the radially arranged magnets 12 to the radially arranged coils 14 determine how much force is needed to move the radially arranged magnets 12 past the radially arranged coils 14 and how much power can be generated. For a given system the axial proximity of the set of radially arranged magnets 12 to the set of radially arranged coils 14 determines how much force is needed to pass the radially arranged magnets 12 past the radially arranged coils 14 and how much power is generated. The closer the radially arranged magnets 12 are located to the radially arranged coils 14, the higher the force needed to rotate the plurality of vanes 18 coupled to one of the sets of radially arranged magnets 12 or radially arranged coils 14. The further apart the radially arranged magnets 12 and radially arranged coils 14 are located, the less power is produced when the set of radially arranged magnets 12 passes the set of radially arranged coils 14. The precise construction of the radially arranged magnets 12 and the radially arranged coils 14 may vary, and all known constructions of radially arranged magnets 12 and radially arranged coils 14 in turbines are considered to be within the scope of the present disclosure.

In addition to controlling how much power is generated, the axial proximity of the radially arranged magnets 12 to the radially arranged coils 14 may be used to regulate the speed of the plurality of vanes 18. A small axial proximity of the radially arranged magnets 12 to the radially arranged coils 14 increases the interaction between the flux field of the radially arranged magnets 12 and the inductive properties of the radially arranged coils 14 thereby increasing the amount of force necessary to move the radially arranged magnets 12 past the radially arranged coils 14. Reducing the proximity of the radially arranged magnets 12 to the radially arranged coils 14 could act as a break to slow down the rotation of the plurality of vanes 18.

Figure 2:
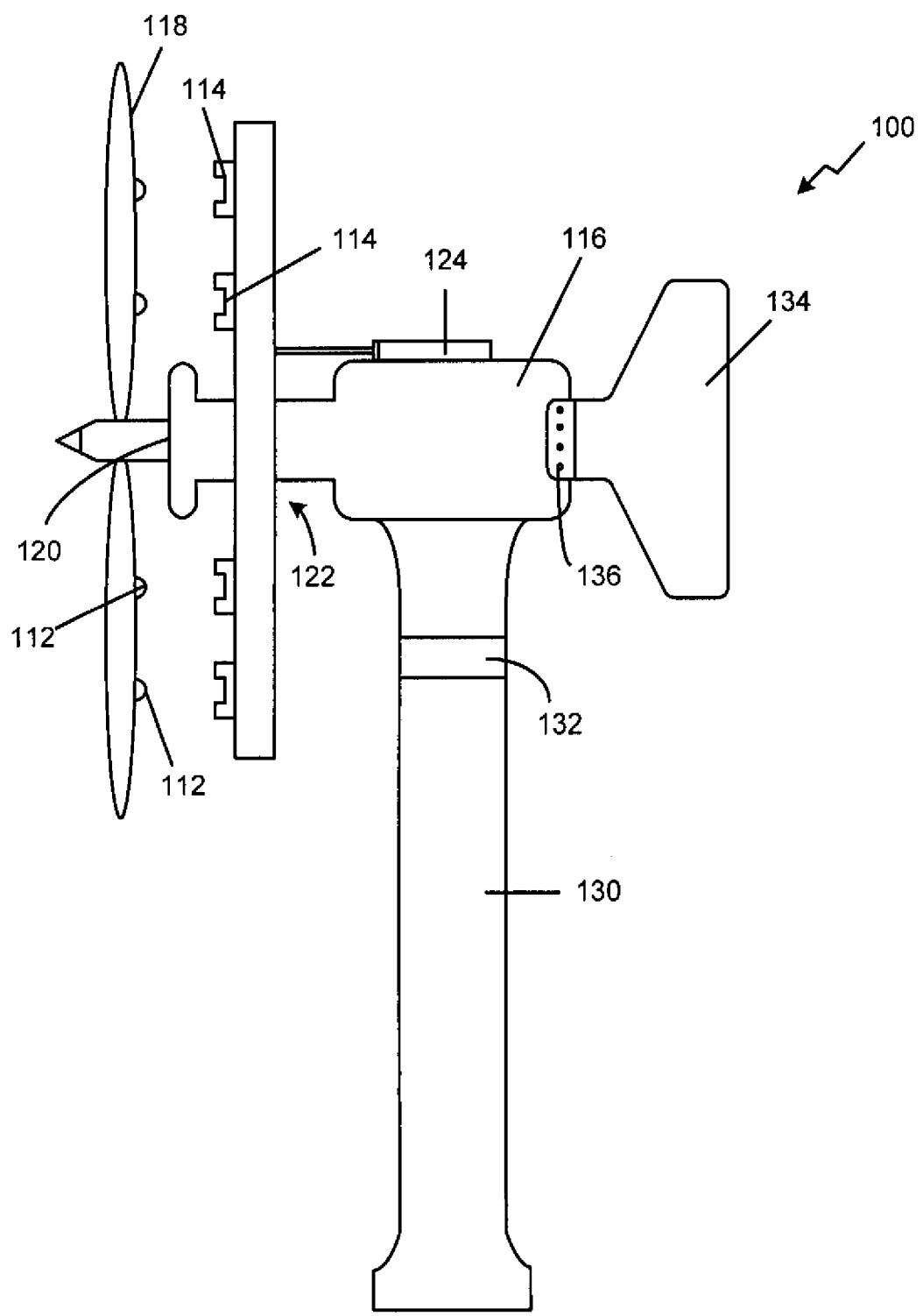
FIG. 2 is an illustration of the fluid turbine apparatus, in accordance with a second exemplary embodiment of the present disclosure.

The set of radially arranged magnets 12 and the set of radially arranged coils 14 may include multiple sets of radially arranged magnets 12 and radially arranged coils 14 (shown in FIG. 2). The number of sets of radially arranged magnets 12 and radially arranged coils 14 used in the system can be selected based on a variety of conditions, including the amount of fluid force expected to be exerted on the fluid turbine 10.

The turbine base 16 supports the first of the sets of radially arranged magnets 12 and radially arranged coils 14. While the turbine base 16 supports the first of the sets, the second of the sets is coupled to the plurality of vanes 18. The set coupled to the plurality of vanes 18 rotates together with the plurality of vanes 18 in response to fluid force. FIG. 1 shows the first of the sets as the set of radially arranged coils 14 supported by the turbine base 16 and the second of the sets as the set of radially arranged magnets 12 coupled to the plurality of vanes 18.

The second of the sets can be coupled to the plurality of vanes 18 by supporting the radially arranged magnets 12 or the radially arranged coils 14 on the plurality of vanes 18. The second of the sets can also be coupled to the plurality of vanes 18 by supporting the radially arranged magnets 12 or radially arranged coils 14 on a support member, such as a rim that is mounted to the plurality of vanes 18. The support member holding the radially arranged magnets 12 or radially arranged coils 14 can also be attached to the rotatable connection 20. The second of the sets should be coupled to the plurality of vanes 18 to allow the second of the sets to rotate in response to the rotation of the plurality of vanes 18.

The linear actuator 24 is supported on the turbine base 16 and influences the axial proximity of the set of radially arranged magnets 12 to the set of radially arranged coils 14. The axial proximity of the set of radially arranged magnets 12 to the set of radially arranged coils 14 determines how much rotational resistance is in the system. Increased axial proximity allows for the system 10 to start up and generate power at very low fluid forces. This arrangement minimizes the rotational resistance of the fluid turbine 10 and allows the fluid turbine to start without requiring an additional generator. Similarly, the decreased axial proximity of the sets at higher fluid forces allows the radially arranged magnets 12 to pass closer to the radially arranged coils 14 thereby generating more power.

The linear actuator 24 responds to the amount of fluid force applied to the fluid turbine 10 and allows for the turbine to decrease the axial proximity of the sets at higher fluid forces and increase the axial proximity of the sets at lower fluid forces. The response of the linear actuator 24 to the amount of fluid force applied to the fluid turbine 10 allows the apparatus to control the rotation speed of the plurality of vanes 18 and the amount of power that is generated by the axial proximity of the sets of radially arranged magnets 12 and radially arranged coils 14.

The linear actuator 24 can be engaged with the turbine base 16 and the linearly slideable connection 22. The axial proximity of the set of radially arranged magnets 12 to the set of radially arranged coils 14 is changed when the linear actuator 24 responds to fluid forces that move the linearly slideable connection 22. The linear actuator 24 can respond to a signal from a fluid sensor or to a mechanical arrangement that senses the amount of fluid force available.

The linear actuator 24 can respond to the fluid forces applied to the plurality of vanes 18 having a linearly slideable connection 22 to the turbine base 16. The forces applied to the plurality of vanes 18 cause the displacement of the linearly slideable connection 22. The linear actuator 24 responds to the displacement of the linearly slideable connection 22 thereby influencing the axial proximity of the set of radially arranged magnets 12 to the set radially arranged coils 14.

As shown in FIG. 1, the linear actuator can be an elastic member 26 such as a compression spring, elastic spring, extension spring, air spring, or others elastic members that are known to those having ordinary skill in the art. The elastic member 26 engages the turbine base 16 on a first end and the linearly slideable connection 22 on the second end. Fluid forces applied to the plurality of vanes 18 may cause the linearly slideable connection 22 to depress or compress the elastic member 26. When the amount of fluid force is decreased the elastic member 26 returns to the original length. The response of the elastic member 26 to the changes in the applied fluid forces influences the axial displacement of the plurality of vanes 18 coupled to one of the sets. The axial displacement of the plurality of vanes 18 and the linearly slideable connection 22 influences the axial proximity of the set coupled to the plurality of vanes 18 to the set supported on the turbine base 16.

FIG. 2 is an illustration of the fluid turbine apparatus 100, in accordance with a second exemplary embodiment of the present disclosure. The fluid turbine apparatus 100 contains a set of radially arranged magnets 112 and a set of radially arranged coils 114 axially aligned with the set of radially arranged magnets 112. A turbine base 116 supports at least one of the sets of radially arranged magnets 112 and radially arranged coils 114. A plurality of vanes 118 has a rotatable connection 120 to the turbine base 116. The second of the sets is coupled to the plurality of vanes 118. A linear actuator 124 is supported on the turbine base 116. The linear actuator 124 influences the axial proximity of the set of radially arranged magnets 112 to the set of radially arranged coils 114. The linear actuator 124 engages the turbine base 116 and one of the sets having a linearly slideable connection 122 to the turbine base 116. The fluid turbine apparatus may also include a stand 130 having a rotatable stand connection 132 to the turbine base 116. The apparatus may also include a rudder 134 having a hinged portion 136.

In accordance with the second exemplary embodiment, the linear actuator 124 may engage the turbine base 116 and at least one of the sets of radially arranged magnets 112 and radially arranged coils 114. The set of radially arranged magnets 112 or radially arranged coils 114 that the linear actuator 124 engages, has a linearly slideable connection 122 to the turbine base 116. The linearly slideable connection 122 may comprise rails or other components known to those having ordinary skill in the art to allow the set to have a linearly slideable connection 122 to the turbine base 116.

The linearly slideable connection 122 allows the linear actuator 124 to vary the axial proximity of the set of radially arranged magnets 112 to the set of radially arranged coils 114. FIG. 2 shows the set of radially arranged magnets 112 supported by the plurality of vanes 118 and the set of radially arranged coils 114 supported by the turbine base 116 having a linearly slideable connection 122. The radially arranged magnets 112 rotate with the plurality of vanes 118 but may remain linearly stationary. The set of radially arranged coils 114 have the linearly slideable connection 122 which may allow the set of radially arranged coils 114 to slide and change the axial proximity of the radially arranged coils 114 to the set of radially arranged magnets 112.

The force created as the radially arranged magnets 112 approach the radially arranged coils 114 dampens the rotational velocity of the plurality of vanes 118. Changing the axial proximity of the radially arranged coils 114 to the set of radially arranged magnets 112 will change the magnitude of dampening of the rotational velocity. By controlling the dampening of the rotational velocity, the rotational velocity of the plurality of vanes 118 can be controlled. Depending on the length of the vanes 118 and the positioning of the radially arranged coils 114 and the set of radially arranged magnets 112, the rotational velocity may be controlled so that the linear actuator 124 outputs single phase AC power that does not need to be significantly manipulated before supplying power to a residence.

The rudder 134 rotates the turbine base 116 in response to changes in fluid force direction. As shown in FIG. 2, the rudder 134 may include a hinged portion 136. Turning the hinged portion 136 out of the plane of the rudder 134 may keep the vanes 118 from facing the fluid force, which may be desirable when an excessive wind or fluid force could cause the vanes 118 to reach a rotational speed that might damage the fluid turbine apparatus 100.

The turbine base 116 may be mounted to a stand 130. The turbine base 116 may be mounted to the stand 130 through a variety of connections, including a rotatable stand connection 132 that may allow the turbine base 116 to rotate relative to the stand 130. The rudder 134 and hinged portion 136 may cause the turbine base 116 to rotate on the stand 130 in response to changes in the fluid force direction.

Figure 3:
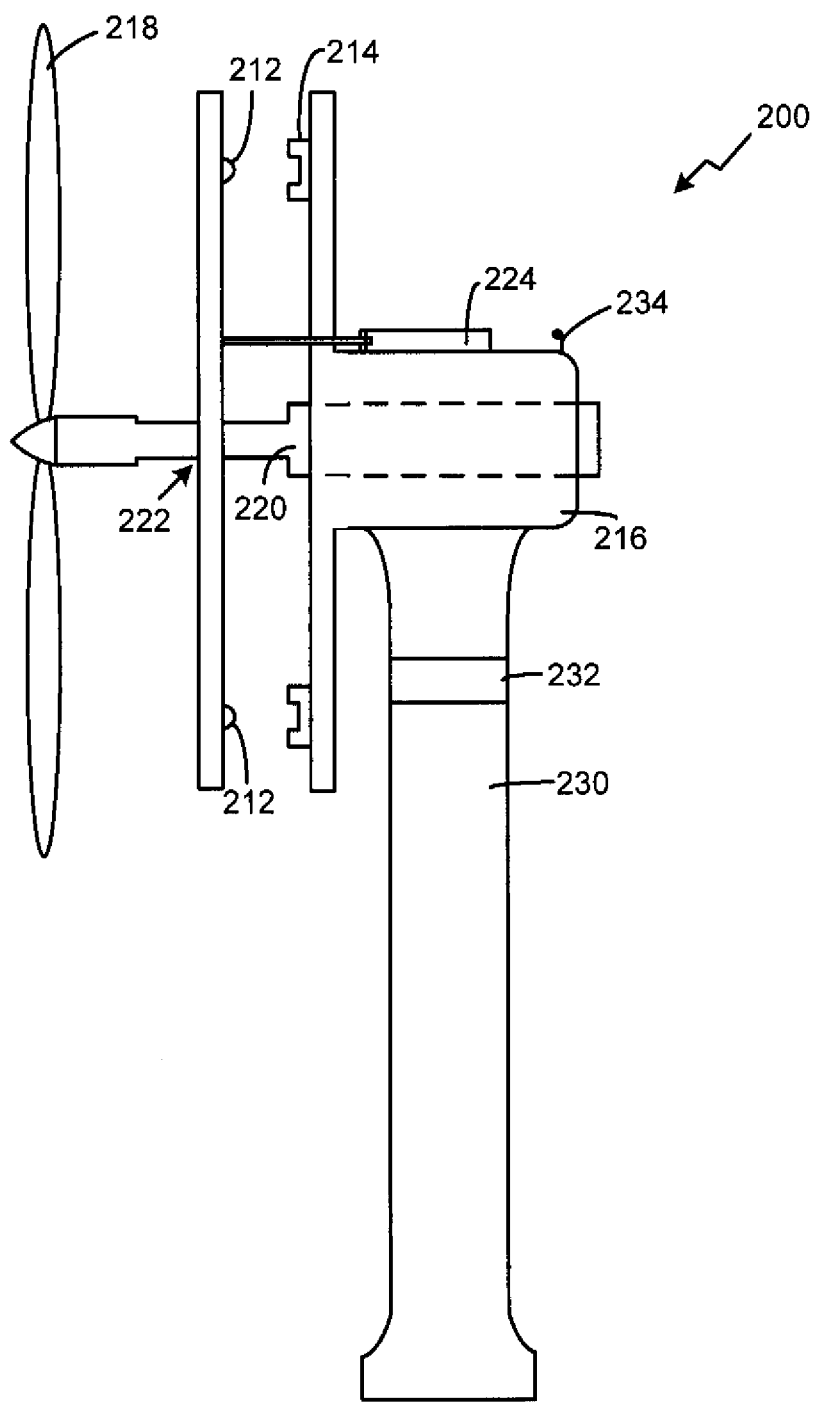
FIG. 3 is an illustration of the fluid turbine apparatus, in accordance with a third exemplary embodiment of the present disclosure.

FIG. 3 is an illustration of a fluid turbine apparatus 200, in accordance with a third exemplary embodiment of the present disclosure. The fluid turbine apparatus 200 contains a set of radially arranged magnets 212 and a set of radially arranged coils 214 axially aligned with the set of radially arranged magnets 212. A turbine base 216 supports at least one of the sets of radially arranged magnets 212 and radially arranged coils 214. A plurality of vanes 218 has a rotatable connection 220 to the turbine base 216. The second of the sets of radially arranged magnets 212 and radially arranged coils 214 is coupled to the plurality of vanes 218. A linear actuator 224 is supported on the turbine base 216. The linear actuator 224 is engaged with the turbine base 216 and at least one of the sets of radially arranged magnets 212 and radially arranged coils 214, wherein one of the sets has a linearly slideable connection 222 to the rotatable connection 220 of the plurality of vanes 218. The fluid turbine apparatus 200 may also include a stand 230 having a rotatable stand connection 232 to the turbine base 216 and a fluid force sensor 234. Not all of the magnets 212 need to be set at the same depth or protrude the same amount from the plurality of vanes 218. Setting the magnets 212 at varying levels may allow only a couple of magnets 212 to generate power in the lightest of winds, but make use of all of the magnets 212 as the winds increase and the plurality of vanes 218 slides along the linearly slideable connection 222.

In accordance with the third exemplary embodiment, the linear actuator 224 may engage the turbine base 216 and at least one of the sets of radially arranged magnets 212 and radially arranged coils 214, having a linearly slideable connection 222 to the rotatable connection 220 of the plurality of vanes 218. FIG. 3 shows the radially arranged magnets 212 having a linearly slideable connection 222 to the rotatable connection 220 of the plurality of vanes 218. The radially arranged coils 214 are supported in place by the turbine base 216. The radially arranged magnets 212 are coupled to the rotatable connection 220 to allow the radially arranged magnets 212 to rotate with the plurality of vanes 218. The set of radially arranged magnets 212 also has a linearly slideable connection 222 that allows the radially arranged magnets 212 to slide along the rotatable connection 220. The linear actuator 224 is connected to the set of radially arranged magnets 212 to influence the axial proximity of the two sets.

The connection of the linear actuator 224 to the set of radially arranged magnets 212 should allow the set of radially arranged magnets 212 to rotate with the plurality of vanes 218 while being able to move the set of radially arranged magnets 212 along the rotatable connection 220. If a rim is used to support the radially arranged magnets 212, the rim can be coupled to the rotatable connection 220 and a ball joint connected to the linear actuator 224 can be inserted into a socket on the plane of the rim that follows the circumference of the rim. Other multidimensional connections may be used known to those having ordinary skill in the art to allow the set of radially arranged magnets 212 to rotate with the plurality of vanes 218 and to have a linearly slideable connection 222 to the rotational connection 220.

The rotatable base connection 232 between the turbine base 216 and the stand 230 may include a yaw motor driving a yaw gear set for turning the turbine base 116 in the optimal direction in response to varying fluid force direction. A fluid force sensor 234, such as an anemometer, may be used to send a signal to the yaw motor or the linear actuator 224. The fluid force sensor 234 may also be used to send fluid force signals to the linear actuator 224 to control the axial proximity of the sets of radially arranged magnets 212 and radially arranged coils 214.

Figure 4:
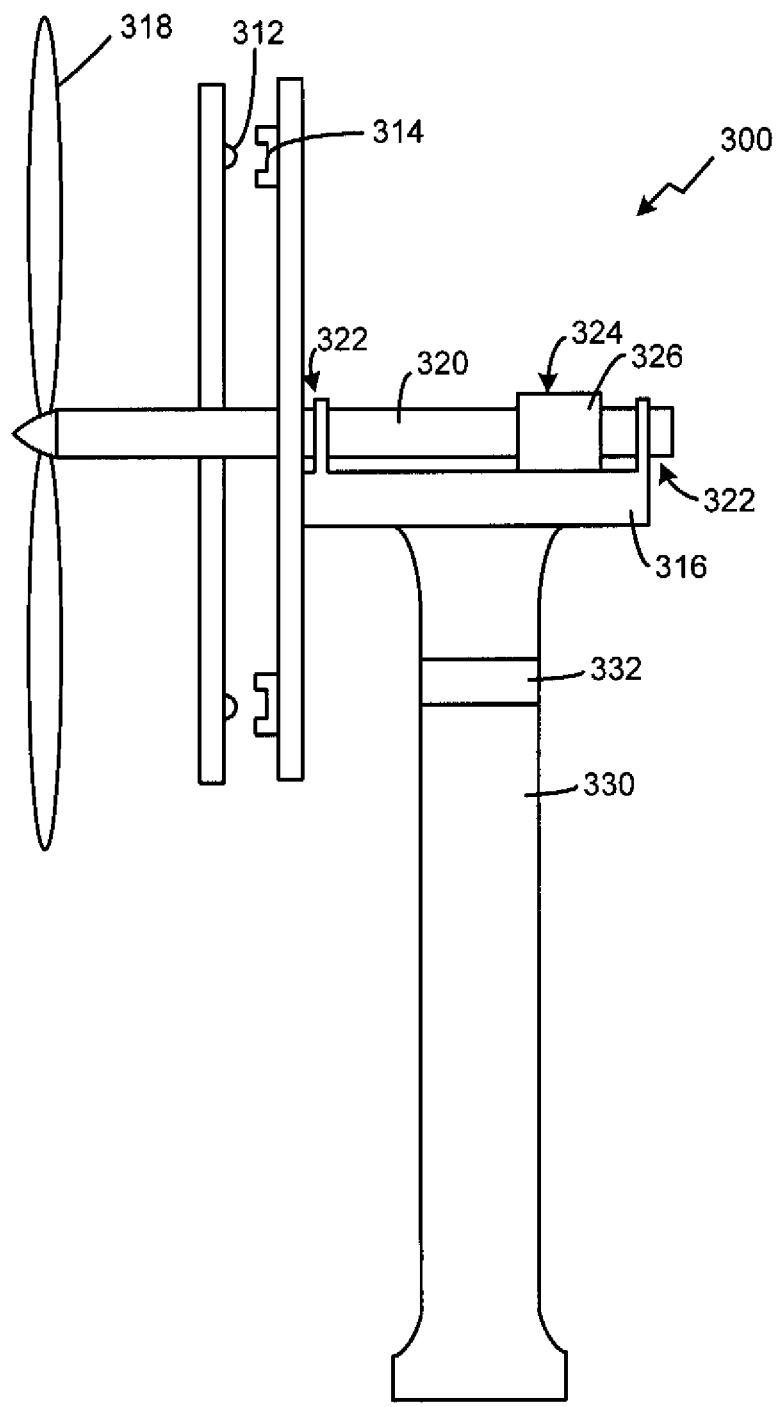
FIG. 4 is an illustration of the fluid turbine apparatus, in accordance with a fourth exemplary embodiment of the present disclosure.

FIG. 4 is an illustration of the fluid turbine apparatus 300, in accordance with a fourth exemplary embodiment of the present disclosure. The fluid turbine apparatus 300 contains a set of radially arranged magnets 312 and a set of radially arranged coils 314 axially aligned with the set of radially arranged magnets 312. A turbine base 316 supports at least one of the sets of radially arranged magnets 312 and radially arranged coils 314. A plurality of vanes 318 has a rotatable connection 320 and a linearly slideable connection 322 to the turbine base 316. The second of the sets is coupled to the plurality of vanes 318 and to the linearly slideable connection 322. A linear actuator 324, which may be controlled by a motor 326, is supported on the turbine base 316 influences the axial proximity of the set of radially arranged magnets 312 to the set of radially arranged coils 314. The fluid turbine apparatus 300 may also include a stand 330 having a rotatable stand connection 332 to the turbine base 316.

In accordance with the fourth exemplary embodiment, one of the sets of radially arranged magnets 312 and radially arranged coils 314 is coupled to the linearly slideable connection 322 of the plurality of vanes 318. The linearly slideable connection 322 may allow the plurality of vanes 318 to respond to fluid forces applied to the fluid turbine apparatus 300. As the force is exerted on the plurality of vanes 318 or a fluid force sensor (not shown) the linearly slideable connection 322 is linearly displaced. The set that is coupled to the linearly slideable connection 322 is linearly displaced together with the plurality of vanes 318. The coupling of the set to the linearly slideable connection 322 allows the set to rotate with the plurality of vanes 318 and move together with the linearly slideable connection 322 when it is linearly displaced.

FIG. 4 illustrates the set of radially arranged magnets 312 coupled to the plurality of vanes 318 and to the linearly slideable connection 322, and the set of radially arranged coils 314 mounted to the turbine base 316. Either or both of the sets of radially arranged magnets 312 and radially arranged coils 314 may be supported by one or more rims. The axial proximity of the sets of radially arranged magnets 312 and radially arranged coils 314 is changed in response to the force exerted on the fluid turbine apparatus 300. The linear actuator 324 can influence the axial proximity of the sets by directly controlling the axial displacement of the linearly slideable connection 322 or by responding to fluid forces applied to the plurality of vanes 318. A motor 326, or another mechanism capable of creating a linear actuation may control the linear actuator 324. The motor 326 could control the linear displacement of the linearly slideable connection 322 in response to a fluid control signal from a fluid force sensor.

Figure 5:
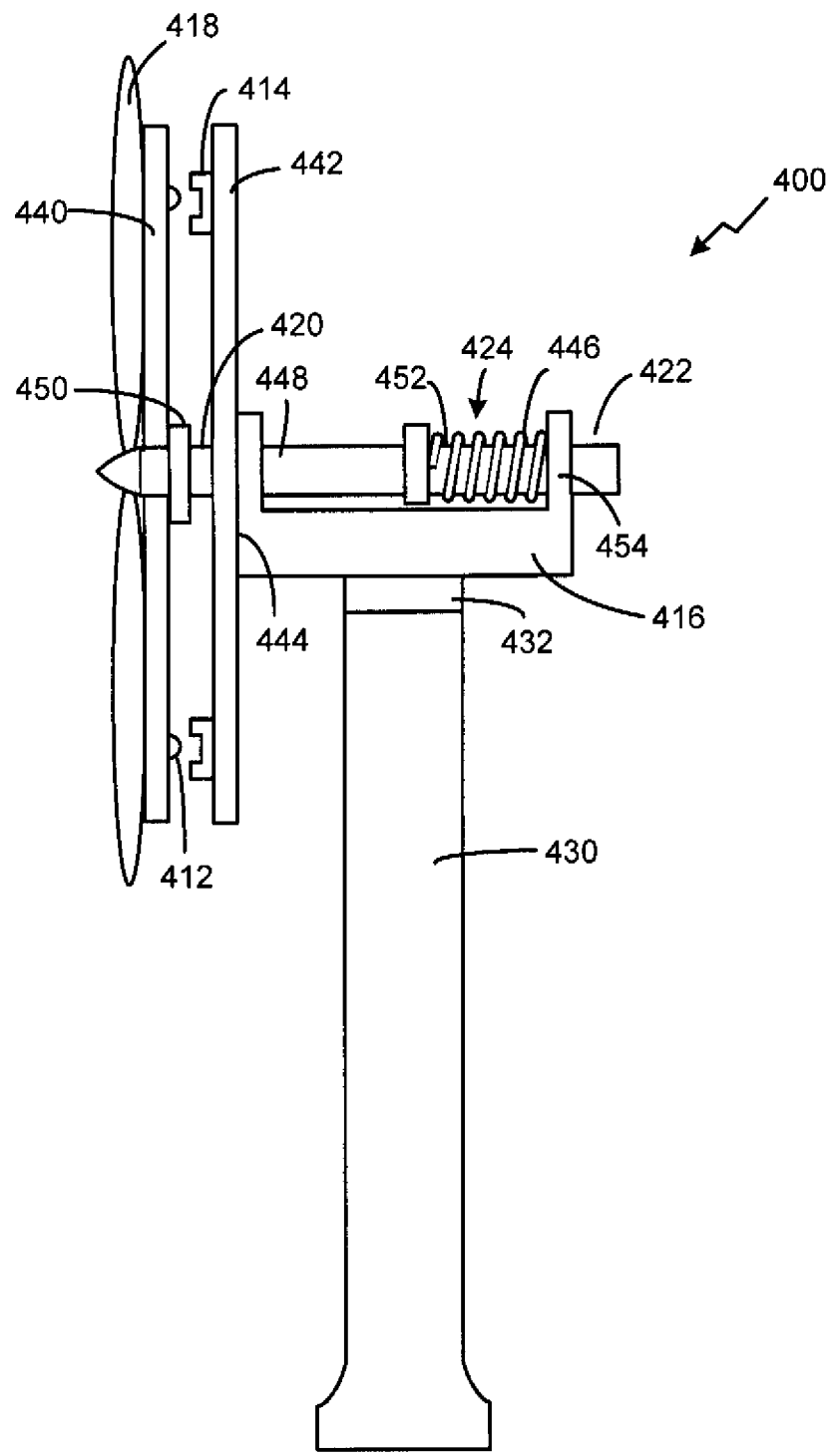
FIG. 5 is an illustration of the fluid turbine apparatus, in accordance with a fifth exemplary embodiment of the present disclosure.

FIG. 5 is an illustration of the fluid turbine apparatus 400, in accordance with a fifth exemplary embodiment of the present disclosure. The fluid turbine apparatus 400 contains a set of radially arranged magnets 412. A set of radially arranged coils 414 is axially aligned with the set of radially arranged magnets 412. A turbine base 416 supports at least one of the sets of radially arranged magnets 412 and radially arranged coils 414. A stand 430 having a rotatable base connection 432 can support the turbine base 416. In the embodiment shown in FIG. 5, the turbine base 416 supports the coils 414. A plurality of vanes 418 have a rotatable connection 420 to the turbine base 416 and can also have a linearly slideable connection 422. A linear actuator 424 is supported on the turbine base 416 and influences the axial displacement of the set of radially arranged magnets 412 and set of radially arranged coils 414.

The first rim 440 and second rim 442 support the radially arranged magnets 412 and the radially arranged coils 414, respectively. The first and second rims 440, 442 may allow for precise alignment of the radially arranged magnets 412 and the radially arranged coils 414. The first rim 440 can be attached to plurality of vanes 418. The second rim 442 is attached to a front plate 444 of the turbine base 416. The rotation of the vanes 418, in response to fluid force, will cause the radially arranged magnets 412 to move along a rotation path while the radially arranged coils 414 remain rotationally stationary. Passing the radially arranged magnets 412 along the radially arranged coils 414 will generate a current in the radially arranged coils 414 to produce power, as is known to those having ordinary skill in the art.

The linear actuator 424 may include an elastic member 446 such as a thrust spring and a biasing arm 448 that extends to a biasing wheel 450. The biasing wheel 450 is fixed to the plurality of vanes 418 through the first rim 440. The elastic member 446 is attached to the biasing arm 448 at a first end 452 and to the turbine base 416 through a support bracket 454. A strong fluid force into the face of the plurality of vanes 418, will push against the biasing wheel 450, the biasing arm 448 and the elastic member 446, causing the elastic member 446 to at least partially compress. As the elastic member 446 compresses, the magnets 412 and coils 414 are brought into greater proximity, improving power production efficiency. As the wind lightens, the elastic member 446 relaxes, pushing out on the biasing arm 448 and, therethrough, the vanes 418 and separating the radially arranged magnets 412 and the radially arranged coils 414 to allow rotation in light fluid forces.

Figure 6:
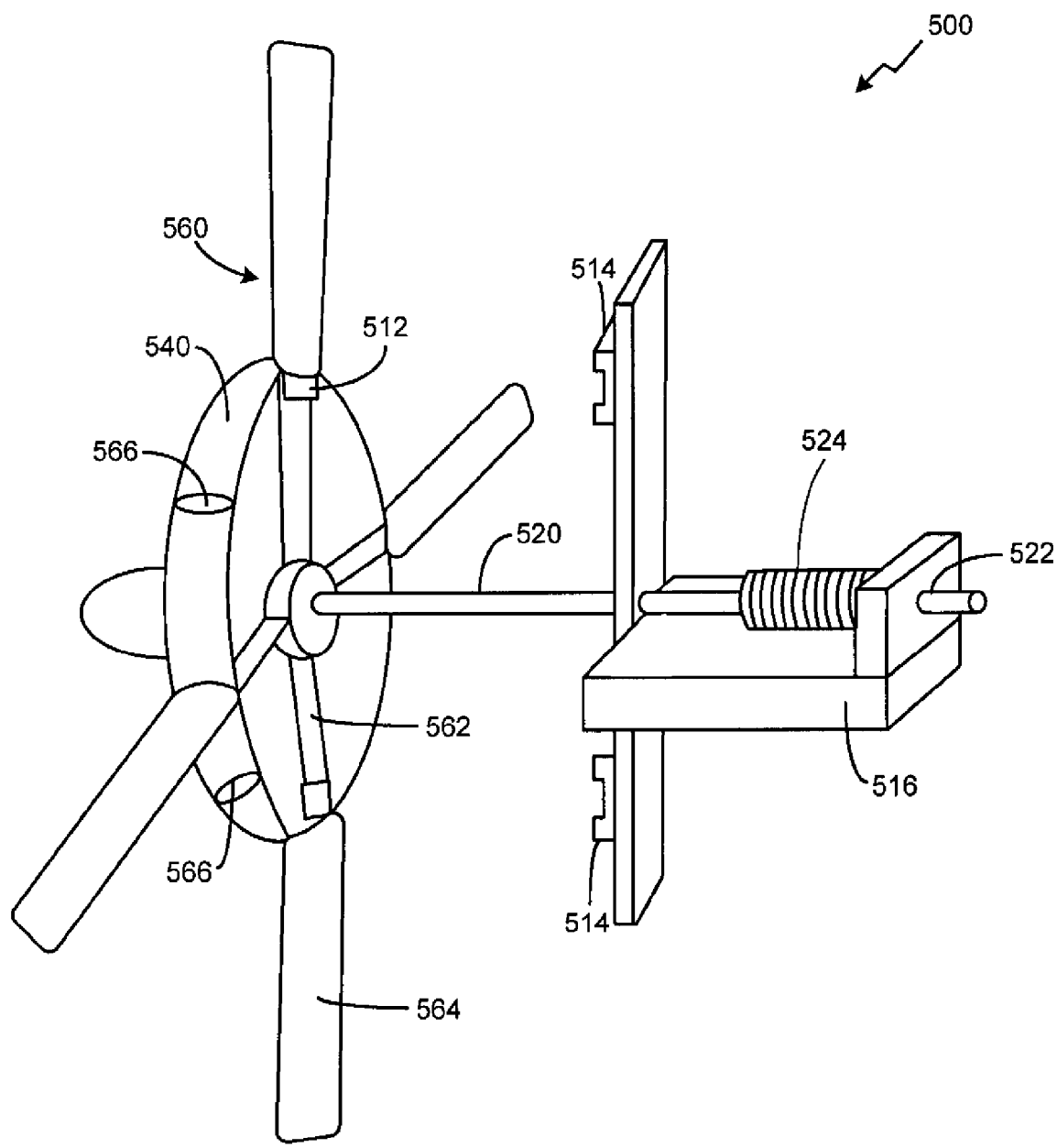
FIG. 6 is an illustration of the fluid turbine apparatus, in accordance with a sixth exemplary embodiment of the present disclosure.

FIG. 6 is an illustration of the fluid turbine apparatus 500, in accordance with a sixth exemplary embodiment of the present disclosure. The fluid turbine apparatus 500 contains a set of radially arranged magnets 512. A set of radially arranged coils 514 is axially aligned with the set of radially arranged magnets 512. A turbine base 516 supports at least one of the sets of radially arranged magnets 512 and radially arranged coils 514. A plurality of segmented vanes 560 has a rotatable connection 520 to the turbine base 516 and can also have a linearly slideable connection 522 to the turbine base 516. The plurality of segmented vanes 560 has a plurality of inner vanes 562 and a plurality of outer vanes 564. The plurality of segmented vanes 560 may include a first rim 540 to support at least one of the sets of radially arranged magnets 512 and radially arranged coils 514, or to support the plurality of outer vanes 564. The first rim 540 may include outer vane supports 566. A linear actuator 524 is supported on the turbine base 516 and influences the axial displacement of the set of radially arranged magnets 512 and the set of radially arranged coils 514.

FIG. 6 shows the plurality of segmented vanes 560 having a plurality of inner vanes 562 supporting a plurality of outer vanes 564. The plurality of outer vanes 564 may be directly supported by the plurality of inner vanes 562. A first rim 540 may be included to stabilize the plurality of inner vanes 562 and also support the plurality of outer vanes 564. The first rim 540 may also be used to support the set of radially arranged magnets 512. A second rim (not shown) mounted to the turbine base 516 may be used to support the set of radially arranged coils 514.

The plurality of segmented vanes 560 allows the fluid turbine apparatus 500 to have a modular design that is adaptable to varying conditions of the wind or other fluid force. The plurality of segmented vanes 560 includes a plurality of outer vanes 564 that can be removable, allowing a user to customize a total number of outer vanes 564 installed. The plurality of outer vanes 564 can be selected to capture the most force from the fluid at the particular location.

In accordance with the sixth exemplary embodiment, an option to select the number of outer vanes 564 that are included on the fluid turbine apparatus 500 is provided. The number of outer vanes 564 can be selected based on the type of outer vanes 564 used on the fluid turbine apparatus 500 and the amount of fluid force that is expected or anticipated to be exerted on the fluid turbine apparatus 500. Outer vane supports 566 may be used to hold the plurality of outer vanes 564. The outer vane supports 566 may be included on the ends of the plurality of inner vanes 562 or radially arranged on the first rim 540.

The plurality of outer vanes 564 of the sixth exemplary embodiment, or any of the plurality of vanes 18, 118, 218, 318, 418 of the previously described embodiments, may include vanes that have an adjustable pitch. The system to adjust the pitch may be any system known to those having ordinary skill in the art. The adjustable pitch control of the vanes may be linked to the axial displacement of the vanes. The axial displacement due to increased or decreased fluid forces would change the pitch of the vanes to capture the desired amount of force from the fluid.

Figure 7:
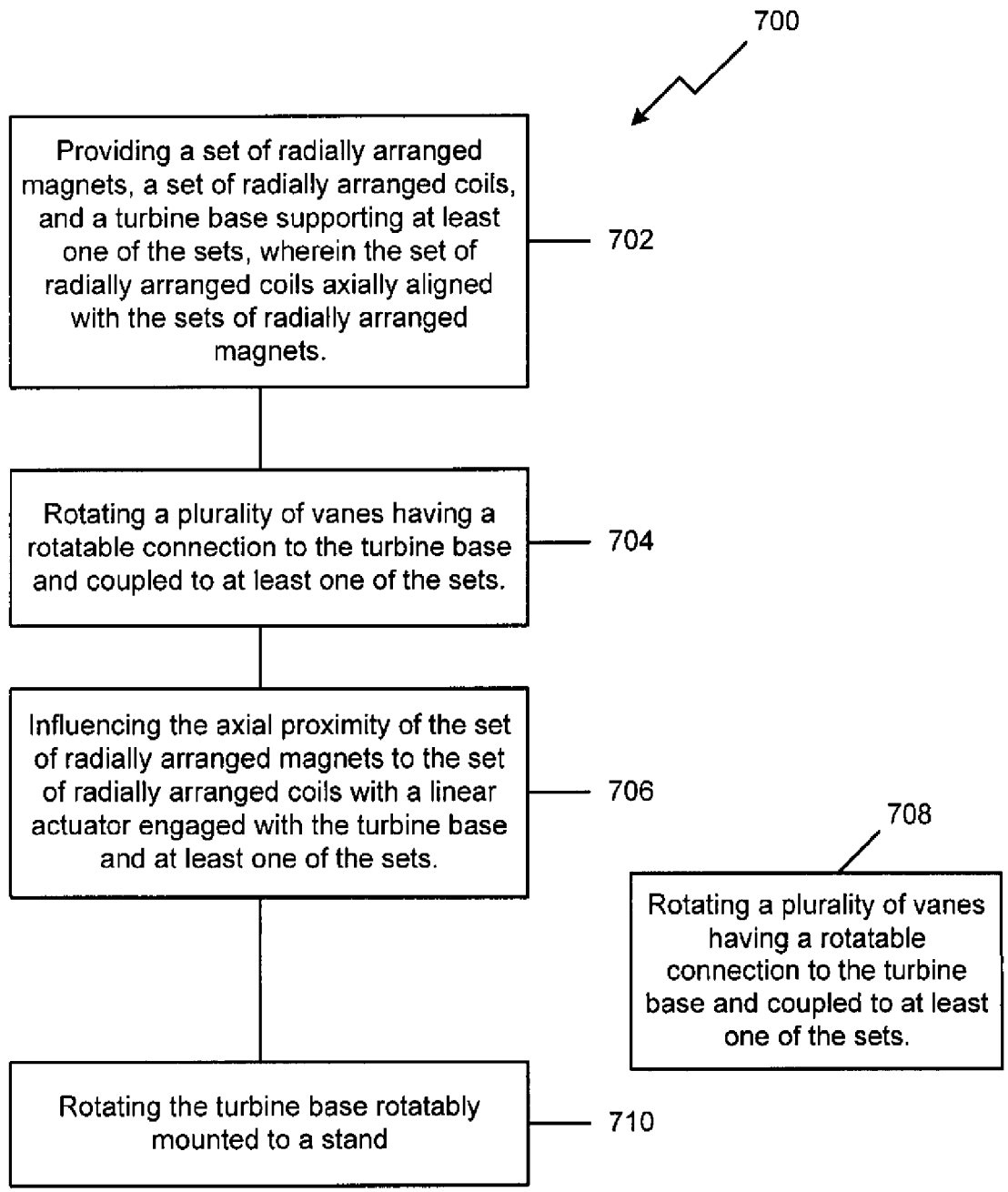
FIG. 7 is a flowchart illustrating a method to operating a fluid turbine apparatus of FIG. 1, in accordance with the first exemplary embodiment of the present disclosure.

FIG. 7 is a flowchart 700 illustrating a method of operating a fluid turbine apparatus 10 of FIG. 1, in accordance with the first exemplary embodiment of the present disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 702, the first step may include providing a set of radially arranged magnets 12, a set of radially arranged coils 14, and a turbine base 16 supporting at least one of the sets, wherein the set of radially arranged coils 14 axially aligned with the set of radially arranged magnets 12. At block 704, the method of operating a fluid turbine apparatus 10 may include rotating a plurality of vanes 18 having a rotatable connection 20 to the turbine base 16 and coupled to at least one of the sets. At block 706, the method of operating a fluid turbine apparatus 10 may include influencing the axial proximity of the set of radially arranged magnets 12 to the set of radially arranged coils 14 with a linear actuator 24 engaged with the turbine base 16 and at least one of the sets. At block 708, the step of rotating a plurality of vanes 18 having a rotatable connection 20 to the turbine base 16 and coupled to at least one of the sets of radially arranged magnets 12 and radially arranged coils 14 may be included. It is noted that a fluid force sensor within the fluid turbine apparatus 10 may sense the amount of force that may be exerted on the plurality of vanes 18. At block 710, the step of rotating the turbine base 16 rotatably mounted to a stand may be provided.

The method of operating a fluid turbine apparatus, as described above is described in relation to the first exemplary embodiment, as best illustrated in FIG. 1. However, variations may be included with the method, in which the method may be used with any of the other exemplary embodiments described herein.

It should be emphasized that the above-described embodiments of the present disclosure, particularly, any "preferred" embodiments, are merely possible examples of implementations, merely set forth for a clear understanding of the principles of the disclosed system and method. Many variations and modifications may be made to the above-described embodiments of the disclosure without departing substantially from the spirit and principles of the disclosure. All such modifications and variations are intended to be included herein within the scope of this disclosure and protected by the following claims.

What is claimed is:

1. A fluid turbine apparatus comprising:
a set of radially arranged magnets;
a set of radially arranged coils, the set of radially arranged coils axially aligned with the set of radially arranged magnets;
a turbine base supporting one of the group consisting of the set of radially arranged magnets and the set of radially arranged coils;
a plurality of vanes having a rotatable connection to the turbine base and coupled to another of the group consisting of the set of radially arranged magnets and the set of radially arranged coils; and
a linear actuator supported on the turbine base, influencing the axial proximity of the set of radially arranged magnets to the set of radially arranged coils.

2. The fluid turbine apparatus of claim 1, wherein the linear actuator is an elastic member.

3. The fluid turbine apparatus of claim 1, wherein the linear actuator is a motor driven linear actuator.

4. The fluid turbine apparatus of claim 1, wherein the plurality of vanes has a linearly slideable connection to the turbine base.

5. The fluid turbine apparatus of claim 4, wherein the linear actuator is engaged with the turbine base and the linearly slideable connection, thereby influencing an axial displacement of the plurality of vanes.

6. The fluid turbine apparatus of claim 5, wherein the axial displacement of the plurality of vanes influences a pitch of the plurality of vanes.

7. The fluid turbine apparatus of claim 4, wherein the set of radially arranged magnets are coupled to the linearly slideable connection and the set of radially arranged coils is mounted to the turbine base.

8. The fluid turbine apparatus of claim 1, wherein the set of radially arranged magnets are supported by the plurality of vanes and the set of radially arranged coils are supported by the turbine base.

9. The fluid turbine apparatus of claim 1, wherein the linear actuator is engaged with the turbine base and at least one of the sets having a linearly slideable connection to the turbine base.

10. The fluid turbine apparatus of claim 1, wherein the linear actuator is engaged with the turbine base and at least one of the sets having a linearly slideable connection to the rotatable connection.

11. The fluid turbine apparatus of claim 1, wherein the plurality of vanes is a plurality of segmented vanes having a plurality of inner vanes and a plurality of outer vanes, wherein the plurality of outer vanes is supported by the plurality of inner vanes.

12. The fluid turbine apparatus of claim 11, wherein the set of radially arranged magnets are supported by the plurality of inner vanes and the set of radially arranged coils are mounted to the turbine base.

13. The fluid turbine apparatus of claim 1, further comprising:
- a first rim mounted to the plurality of vanes and supporting the set of radially arranged magnets; and
- a second rim mounted to the turbine base and supporting the set of radially arranged coils.

14. The fluid turbine apparatus of claim 1, wherein the turbine base is rotatably mounted to a stand.

15. The fluid turbine apparatus of claim 14, further comprising a rudder attached to the turbine base, whereby the rudder rotates the turbine base in response to changes in force direction.

16. A method of operating a fluid turbine apparatus, the method comprising:
- providing a set of radially arranged magnets, a set of radially arranged coils, and a turbine base supporting at least one of the sets, wherein the set of radially arranged coils axially aligned with the set of radially arranged magnets;
- rotating a plurality of vanes having a rotatable connection to the turbine base and coupled to at least one of the sets; and
- influencing the axial proximity of the set of radially arranged magnets to the set of radially arranged coils with a linear actuator engaged with the turbine base and at least one of the sets.

17. The method of claim 16, wherein the set of radially arranged magnets are supported by the plurality of vanes and the set of radially arranged coils are supported by the turbine base.

18. The method of claim 16, wherein the step of influencing the axial proximity of the set of radially arranged magnets to the set of radially arranged coils includes moving one of the sets coupled to the plurality of vanes in response to the amount of fluid force exerted on the plurality of vanes.

19. The method of claim 16, further comprising rotating the turbine base rotatably mounted to a stand.

20. A fluid turbine apparatus comprising:
- means for providing a set of radially arranged magnets, a set of radially arranged coils, and a turbine base supporting at least one of the sets, wherein the set of radially arranged coils axially aligned with the set of radially arranged magnets;
- means for rotating a plurality of vanes having a rotatable connection to the turbine base and coupled to at least one of the sets; and
- means for influencing the axial proximity of the set of radially arranged magnets to the set of radially arranged coils with a linear actuator engaged with the turbine base and at least one of the sets.

* * * * *